United States Patent Office

3,497,487
Patented Feb. 24, 1970

3,497,487
METHOD OF IMPROVING THE WATER SLURRYING PROPERTIES OF POLYVINYL ALCOHOLS
John E. Bristol, Niagara Falls, N.Y., assignor to E. I. du Pont de Nemours and Company, Wilmington, Del., a corporation of Delaware
No Drawing. Filed Feb. 23, 1968, Ser. No. 707,472
Int. Cl. C08f *1/88, 3/34*
U.S. Cl. 260—91.3          7 Claims

ABSTRACT OF THE DISCLOSURE

The water slurrying properties of particulate polyvinyl alcohols which are at least 70% alcoholyzed are improved by heating a slurry of the polyvinyl alcohol in a liquid medium which is a 2 to 20% solution of acetic acid in a solvent comprising methanol, methyl acetate, or a mixture of methanol and methyl acetate, then separating the polyvinyl alcohol from the liquid medium.

BACKGROUND OF THE INVENTION

Polyvinyl alcohols are derived by alcoholyzing (or hydrolyzing polyvinyl esters of carboxylic acids, most generally polyvinyl acetate, so as to replace all or part of the ester groups of the polyvinyl ester with hydroxyl groups, the degree of such replacement generally being referred to as the percent alcoholysis (or hydrolysis). Thus, a polyvinyl alcohol in which 75% of the ester groups of the parent polyvinyl ester have been replaced by hydroxyl groups is commonly referred to as a "75% alcoholyzed" (or hydrolyzed) polyvinyl alcohol. The alcoholysis is usually effected starting with a solution of the polyvinyl ester in a hydrolytic alcohol such as methanol in the presence of an acidic or a basic alcoholysis catalyst. The product polyvinyl alcohol is obtained as a slurry in the alcoholysis mixture which is then neutralized to destroy the alcoholysis catalyst, following which the polyvinyl alcohol particles are removed, e.g., by filtration, and dried. The extent to which the polyvinyl ester is alcoholyzed will generally be at least 50%, and most commercial polyvinyl alcohols are 70 to 100% alcoholyzed and have viscosities of about 5–100 cp., as measured for a 4% aqueous solution at 20° C. by the Hoeppler falling ball method.

Many of the more important uses of polyvinyl alcohols require that they be employed as aqueous solutions. The formation of water solutions of polyvinyl alcohols presents somewhat of a problem, particularly when relatively concentrated solutions are desired. The most useful practice involves slurrying the polyvinyl alcohol in water at ordinary temperatures and then heating the slurry to a temperature of 50–70° C. or higher as required to achieve dissolution of the polyvinyl alcohol. Although polyvinyl alcohols which are 98–100% alcoholyzed are usually relatively insoluble in water at temperatures below 70° C., their water slurrying characteristics at room temperature can vary considerably, depending upon the conditions maintained during the alcoholysis of the parent polyvinyl ester and the conditions under which the polyvinyl alcohol product is dried. Thus, with some of the 98–100% alcoholyzed polyvinyl alcohols, the most concentrated slurries that can be formed and remain fluid at 25–27° C. will be about 4%, while fluid slurries containing up to 28% can be formed with other such polyvinyl alcohols. In general, the use of low temperatures, i.e., 35° C. or lower, during the alcoholysis, followed by filtration and washing of the product at low temperatures with subsequent drying in the absence of water, produces products having poor slurrying characteristics, i.e., the products yield fluid slurries containing not more than 10% solids and they wet out poorly with water at 25–27° C. Alcoholysis at higher temperatures and holding the alcoholyzed slurries at temperatures above 40° C., followed by drying in the presence of a small amount of water, generally results in polyvinyl alcohol products of somewhat improved slurrying properties. Also, alcoholyzed slurries held for a time at 90° C. or higher produce products having slurrying characteristics such that fluid 28% slurries in water can be made at room temperature, which slurries will remain fluid indefinitely at temperatures of 25–30° C.

The procedures indicated above which are effective in improving somewhat the slurrying properties of 98–100% alcoholyzed polyvinyl alcohols are generally ineffective in improving the slurrying properties of cold water soluble polyvinyl alcohols, e.g., those which are 70–90% alcoholyzed. These polyvinyl alcohols are generally soluble in water at room temperature and are, consequently, difficult to slurry in water at room temperatures. The only way heretofore known for improving the slurrying properties of such soluble polyvinyl alcohols has been to produce the polyvinyl alcohol in a coarser form. This has not been entirely satisfactory in that the coarser products dissolve more slowly when heated to form the solution.

The present invention is based upon a method of treating particulate polyvinyl alcohols whereby their water slurrying properties can be significantly improved.

SUMMARY OF THE INVENTION

The water slurrying properties of particulate polyvinyl alcohols which are at least 70% alcoholyzed are improved in accordance with the invention by subjecting the particulate polyvinyl alcohol to a heat treatment while slurried in a treating liquid comprising a 2 to 20 weight percent solution of acetic acid in a liquid solvent comprising methanol, methyl acetate or a mixture of methanol and methyl acetate, then separating the polyvinyl alcohol from the treating liquid. The heat treatment is effected at a temperature of at least about 50° C. for a time effective to improve the water slurrying properties of the polyvinyl alcohol.

DETAILED DESCRIPTION AND PREFERRED EMBODIMENTS

The treating liquid employed during the heat treatment for improving the slurrying properties of the polyvinyl alcohol should contain acetic acid at a concentration of at least 2%, since lower concentrations are generally not effective for the intended purpose. Concentrations greater than about 20% cannot be used because they tend to cause reesterification of the polyvinyl alcohol. The solvent for the acetic acid comprises methanol, methyl acetate or any methanolymethyl acetate mixture. Although essentially anhydrous treating liquids are highly effective and preferred, the treating liquid can tolerate small amounts of water, e.g., up to about 8 weight percent when the polyvinyl alcohol is about 95 to 100% alcoholyzed, and up to about 1% water when the polyvinyl alcohol is less than about 95% alcoholyzed, without significantly altering the treating effectiveness of the liquid. The preferred treating liquids are those which are substantially free of water and are 4 to 10% solutions of acetic acid in a solvent consisting of about 30 to 60% methanol and 70 to 40% methyl acetate, but most preferably about 100% methanol.

The method of the invention involves heating the particulate polyvinyl alcohol while it is dispersed or slurried in the treating liquid, then separating the polyvinyl alcohol from the treating liquid. Heating temperatures of at least 50° C. but below the temperature at which the polyvinyl alcohol will decompose (about 200° C.), most generally 50°–150° C., are effective. The preferred temperatures are from about the atmospheric reflux temperature to about 140° C. Thus, temperatures at about the atmospheric reflux temperature of the treating liquid for a period of 4 hours or more, or temperature of about 140° C. under autogeneous pressures for a period of 15 minutes or more, result in a significant improvement in the water slurrying properties of the treated materials. In the case of 70–90% alcoholyzed polyvinyl alcohols, such heat treatments render the products insoluble in water at room temperature without affecting their solubility in water at elevated temperatures, e.g., above 70° C. With such products, the heat treatment appears to exert a skin effect since, when the polyvinyl alcohol is subsequently dissolved in water at elevated temperatures and then cast as films, the film product is indistingishable from films made from solutions of the corresponding untreated 70–90% alcoholyzed product. In the case of the 98–100% alcoholyzed polyvinyl alcohols, the heat tretament of the invention markedly decreases the water sensitivity of the polyvinyl alcohol whereby fluid aqueous slurries at solids concentrations of 35–40% can be readily obtained.

Separation of the heat treated polyvinyl alcohol from the treating liquid following the heat treatment can be effected in any desirable way which will not adversely affect the polyvinyl alcohol. Thus, separation can be affected by vaporizing the treating liquid from the polyvinyl alcohol particles. A very convenient and practical procedure is to remove the polyvinyl alcohol particles from the liquid by filtration or centrifuging, following which the particles are dried, e.g., under reduced pressure, to free them from residual amounts of the liquid.

The method of the invention is illustrated by the following examples in which all composition percentages are by weight.

The treating liquids employed in the examples had the compositions shown in the following tabulation:

COMPOSITIONS OF TREATING LIQUIDS IN WEIGHT PERCENT

| Liquid | Methanol | Methyl acetate | Acetic acid |
|---|---|---|---|
| A | 40 | 60 | |
| B | 38.1 | 57.1 | 4.8 |
| C | 36.3 | 54.6 | 9.1 |
| D | 95.2 | | 4.8 |

Example 1

The particulate polyvinyl alcohol employed in this example was a finely divided product prepared as described in Bristol and Tanner U.S. Patent 2,734,048. It had a viscosity (4% aqueous solution) at 20° C. of 62 cp., an ash content of 0.35% (as $Na_2O$), and a saponification number of 6.4, corresponding to an alcoholysis of 99.5%. In each of the tests carried out, 10 g. of the polyvinyl alcohol were dispersed in from 400–440 g. of the treating liquid and the resulting slurry was then heated, the treating liquids employed, the temperatures of heating and the duration of the heating being as indicated in Table I below. Following the heat treatment, the polyvinyl alcohol was filtered from the treating liquid and vacuum dried at 65° C., following which its slurrying properties were determined. More specifically, the treated polyvinyl alcohol products were tested to determine the maximum slurry concentration in water that could be obtained while still retaining adequate fluidity of the slurry for 24 hours at 26° C. By adequate fluidity is meant a fluidity which permits pouring or pumping of the slurry. The results of the tests are reported in Table I.

TABLE I.—TREATMENTS OF 99.5% ALCOHOLYSED POLYVINYL ALCHOOL

| Treatment | Treating Liquid | Temp., °C. | Time, hours | Max. solids content of fluid water slurry at 26° C., percent |
|---|---|---|---|---|
| A–1 (Control) | A | 54 | 8 | 18 |
| A–2 (Control) | A | 140 | 0.5 | 26 |
| B–1 | B | 54 | 8 | 32 |
| B–2 | B | 140 | 0.5 | 38 |
| C–1 | C | 54 | 8 | 34 |
| C–2 | C | 140 | 0.5 | 38 |
| D–1 | D | 65 | 8 | 36 |
| D–2 | D | 140 | 0.5 | 42 |

It will be seen from the above data that when the treating liquid contained no acetic acid (liquid A) the maximum solids contents of the fluid water slurries obtainable were substantially lower than were obtainable when treating liquids containing acetic acid (liquids B, C and D) were employed. Actually, the water slurrying properties of the products treated using liquid A containing no acetic acid, were essentially the same as the water slurrying properties of the untreated polyvinyl alcohol. It is noteworthy that the products obtained by the treatments using the treating liquids (B, C and D) containing acetic acid were not altered with respect to saponification number or viscosity (4% water solution) and, like the original untreated material, all were completely dissolved when heated in water at 85° C. for 60 minutes.

Example 2

The polyvinyl alcohol employed in this example was an 88% alcoholyzed particulate polyvinyl alcohol obtained by the partial alcoholysis of a high viscosity polyvinyl acetate, following the general procedure described in Scott and Bristol U.S. Patent 2,266,996. The polyvinyl alcohol had a viscosity (4% water solution) at 20° C. of 42 cp. and an ash content of 0.20% (as $Na_2O$). Because this product dissolved in water at 26° C., it was difficult to disperse it in water to obtain a slurry having a solids content greater than 4–5 weight percent before troublesome lump formation occurred.

The treating liquids, treating temperatures and times are shown in Table II together with the maximum slurrying concentrations for the treated products after they had been filtered from the treating liquid and vacuum dried at 65° C.

TABLE II.—TREATMENTS OF 88% ALCOHOLYZED POLYVINYL ALCOHOL

| Treatment | Treating liquid | Temp., °C. | Time, hours | Max. solids content of fluid water slurry at 26° C., percent |
|---|---|---|---|---|
| AA–1 (Control) | A | 54 | 8 | 4–5 |
| AA–2 (Control) | A | 140 | 0.5 | 4–5 |
| BB–1 | B | 54 | 8 | ¹ 16 |
| BB–2 | B | 140 | 0.5 | ² 20 |
| CC–1 | C | 54 | 8 | ³ 22 |
| CC–2 | C | 140 | 0.5 | ³ 26 |
| DD–1 | D | 54 | 8 | ³ 24 |
| DD–2 | D | 140 | 0.5 | ³ 26 |

¹ Slurry remained adequately fluid for 1–2 hours but became thick and non-fluid, i.e., non-pourable, after 24 hours at 26° C.
² Slurry remained adequately fluid for 4 hours, but was appreciably thicker after 24 hours at 26° C.
³ Slurry remained adequately fluid for 24 hours at 26° C.

The above data show clearly that the heat treatments effected in liquids containing acetic acid (liquids B, C and D) improved significantly the slurrying properties of the polyvinyl alcohol. In all cases, the improvements in slurrying properties were achieved without altering the extent to which the polyvinyl alcohol was alcoholyzed, or its viscosity, since the saponification number and viscosity (4% water solution) for each treated sample was

I claim:

1. The method for improving the water slurrying properties of a particulate polyvinyl alcohol which is at least 70% alcoholyzed, comprising subjecting said polyvinyl alcohol to a heat treatment at a temperature of at least 50° C. for a time effective to improve said properties, said heat treatment being effected while said polyvinyl alcohol is dispersed in a treating liquid comprising a 2 to 20 weight percent solution of acetic acid in a solvent comprising methanol or methyl acetate, or a mixture of methanol and methyl acetate, then separating said polyvinyl alcohol from said treating solution.

2. The method of claim 1 wherein the concentration of acetic acid in the solvent is from 4 to 10 weight percent.

3. The method of claim 1 wherein the heat treatment is effected at a temperature from about 50 to 150° C.

4. The method of claim 3 wherein the heat treatment is effected at about the atmospheric reflux temperature of the treating liquid.

5. The method of claim 3 wherein the heat treatment is effected under autogeneous pressure at a temperature above the atmospheric reflux temperature of the treating liquid.

6. The method of claim 1 wherein the treating liquid consists essentially of an acetic acid solution in methanol.

7. The method of claim 1 wherein the treating liquid consists essentially of an acetic acid solution in a mixture of about 30 to 60% methanol and about 70 to 40% methyl acetate.

References Cited

FOREIGN PATENTS 322,157  11/1929  England.

JOSEPH L. SCHOFER, Primary Examiner

STANFORD M. LEVIN, Assistant Examiner

U.S. Cl. X.R.

260—89.1